US008657528B2

United States Patent
Chen et al.

(10) Patent No.: US 8,657,528 B2
(45) Date of Patent: Feb. 25, 2014

(54) BRINE DISPOSAL SYSTEM FOR A BRINE SOURCE

(75) Inventors: Sung-Wei Chen, Singapore (SG); Colin Chan, Singapore (SG)

(73) Assignee: Empire Technology Development LLC, Wilmington, DE (US)

( * ) Notice: Subject to any disclaimer, the term of this patent is extended or adjusted under 35 U.S.C. 154(b) by 289 days.

(21) Appl. No.: 13/062,936

(22) PCT Filed: Aug. 17, 2010

(86) PCT No.: PCT/SG2010/000302
§ 371 (c)(1),
(2), (4) Date: Mar. 8, 2011

(87) PCT Pub. No.: WO2012/023901
PCT Pub. Date: Feb. 23, 2012

(65) Prior Publication Data
US 2012/0043268 A1    Feb. 23, 2012

(51) Int. Cl.
F17D 1/08    (2006.01)
(52) U.S. Cl.
USPC .......... 405/52; 405/36; 405/37; 405/53; 210/170.01; 210/170.11; 210/652; 290/42; 290/43; 290/53; 290/54
(58) Field of Classification Search
USPC .......... 405/36, 37, 51–53, 80, 59, 75, 76; 210/170.01, 170.07, 170.09, 170.11, 210/652; 290/42, 43, 53, 54; 137/236.1
See application file for complete search history.

(56) References Cited

U.S. PATENT DOCUMENTS

| 3,456,802 | A | | 7/1969 | Cole |
| 3,974,654 | A | * | 8/1976 | Mirto, Jr. .................. 405/127 |
| 4,335,576 | A | | 6/1982 | Hopfe |
| 4,391,458 | A | | 7/1983 | Blakeley |
| 4,448,682 | A | * | 5/1984 | Moritz ..................... 210/101 |
| 5,568,781 | A | | 10/1996 | Vaillancourt et al. |
| 5,727,933 | A | | 3/1998 | Laskaris et al. |
| 6,390,870 | B1 | | 5/2002 | Hughes et al. |

(Continued)

FOREIGN PATENT DOCUMENTS

| DE | 20002224 | * | 5/2000 | .............. E02B 3/10 |
| ES | 2311320 A1 | | 2/2009 | |
| NL | 1035015 C2 | | 8/2009 | |
| WO | WO 00/07218 A2 | | 2/2000 | |

OTHER PUBLICATIONS

Author Unknown, "Channel Mixer Mixing Solutions" Komax Systems Inc., Mixing by Design, http://www.komax.com/PDF/ChannelMixerBrochure.pdf, accessed Mar. 8, 2011, 1 page.

(Continued)

*Primary Examiner* — David Bagnell
*Assistant Examiner* — Carib Oquendo
(74) *Attorney, Agent, or Firm* — Woodcock Washburn LLP

(57) ABSTRACT

Brine disposal systems are configured to receive brine from a brine source and to passively collect seawater from a nearby ocean during high tide using one or more tidal forces. Tidal movements during high tide, low tide, or both may be used to mix and thereby dilute the brine with the seawater. The mixture of seawater and brine is then passively discharged into the ocean during low tide using the tidal force, thereby minimizing the impacts on the marine ecosystem.

18 Claims, 5 Drawing Sheets

(56) References Cited

U.S. PATENT DOCUMENTS

| | | | |
|---|---|---|---|
| 6,543,474 | B2 | 4/2003 | Fetterman, Jr. |
| 6,804,962 | B1 | 10/2004 | Prueitt |
| 7,023,104 | B2 | 4/2006 | Kobashikawa et al. |
| 2002/0014460 | A1* | 2/2002 | McKay .................. 210/696 |
| 2005/0023224 | A1 | 2/2005 | Schmitz et al. |
| 2008/0017519 | A1* | 1/2008 | Siemer et al. ............ 205/477 |
| 2008/0053907 | A1 | 3/2008 | Gordon |
| 2010/0116726 | A1 | 5/2010 | Dwek et al. |

OTHER PUBLICATIONS

Author Unknown, "Kenics—Static Mixers", Chemineer Products and Services, http://www.chemineer.com/kenics_products.php, accessed Mar. 8, 2011, 2 pages.

Author Unknown, "Solving Our Water Problems-Desalination Using Solar Thermal Power", The Oil Drum: Discussions About Energy and Our Future Australia and New Zealand, May 2, 2008, 24 pages.

Author Unknown, "U.S. Department of Energy-Efficient and Renewable Energy: Energy Savers", http://www.energysavers.gov/renewableenergy, updated Dec. 30, 2008., 1 page.

Hettler, "Open Seawater system with Controlled Temperature and Salinity" The Progressive Fish-Culturist, Jan. 1971, 33(1) 3-11.

Kumar, "Performance of kenics static mixer over a wide range of Reynolds number" Chemical Engineering Journal, Elsevier Science SA, 2008, 139(2) 284-295.

Malfeito et al., "Brine Discharge from the Javea Desalination Plant", Desalination, Apr. 2005, vol. 185 pp. 87-94.

PCT Application No. PCT/SG2010/000302, International Search Report, Filing date, Aug. 17, 2010, Mailing Date Oct. 25, 2010, 9 pages.

Talavera, "Identification of the mixing processes in brine discharges carried out in Barranco del Toro beach, south of Gran Canaria (Canary Islands)", Desalination, Sep. 20, 2001, 139(1-3), 277-286.

Thakur et al, "Static Mixers in the Process Industries—A Review," Chemical Engineering Research and Design, Aug. 2003, 81 (Part A) 787-826.

Author Unknown, Komax Systems Inc., http://www.komax.com/, accessed Nov. 3, 2010, 1 page.

Barker et al., "Strategic Environmental Assessment of Bristol Water's Draft Water Resource Plan," Strategic Environmental Assessment Environmental Report, Entec UK Ltd., Apr. 2008, 1-92.

GEI/Bookman Edmonston, "Final Report: Evaluation of Seawater Desalination Projects Proposed for the Moneterey Peninsula," Feb. 20, 2008, 112 pages.

* cited by examiner

BRINE DISPOSAL SYSTEM FOR A BRINE SOURCE

CROSS-REFERENCE TO RELATED APPLICATIONS

This application is the National Stage of International Application No. PCT/SG2010/00302, filed Aug. 17, 2010, the disclosure of which is incorporated herein by reference in its entirety.

TECHNICAL FIELD

The present disclosure relates generally to a brine disposal system for a brine source.

BACKGROUND

Water desalination is the process of making fresh water by removing dissolved minerals (including but not limited to salt) from seawater, brackish water, or treated wastewater. Desalination technologies include reverse osmosis, distillation, electrodialysis, and vacuum freezing. Salt extracted from seawater during the desalination process comes out as concentrated brine whose salinity may be twice as high as that of seawater. Brine generated during the desalination process is often discharged directly into the ocean. The high-density desalination waste tends to fall on the sea floor near the brine outfall, creating a very salty layer that may negatively impact the flora, the marine life, and any related human activities in the region.

SUMMARY

One embodiment of the present disclosure may generally relate to a brine disposal system for a brine source. One example brine disposal system may include a water reservoir, a brine reservoir, and an outfall coupled to the water and the brine reservoirs. The water reservoir is located near a water source and stores water from the water source. The brine reservoir stores brine from the brine source. One or more tidal, gravitational, and mechanical forces cause the water to enter and exit the water reservoir, and the brine to exit from the brine reservoir. The outfall discharges a mixture of the water and the brine into an ocean.

Another embodiment of the present disclosure may generally relate to a plant. One example plant may include an equipment generating heat, a brine tank storing brine, and a water cooling system. The water cooling system may further include a cooling loop thermally coupled to the equipment, a pump in the cooling loop, a mixer coupling the brine tank to the cooling loop, and an outfall coupled to the cooling loop to discharge a mixture of the water and the brine into the water source. The pump is configured to circulate water from water source in the cooling loop, and the mixer is configured to mix the brine and the water.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
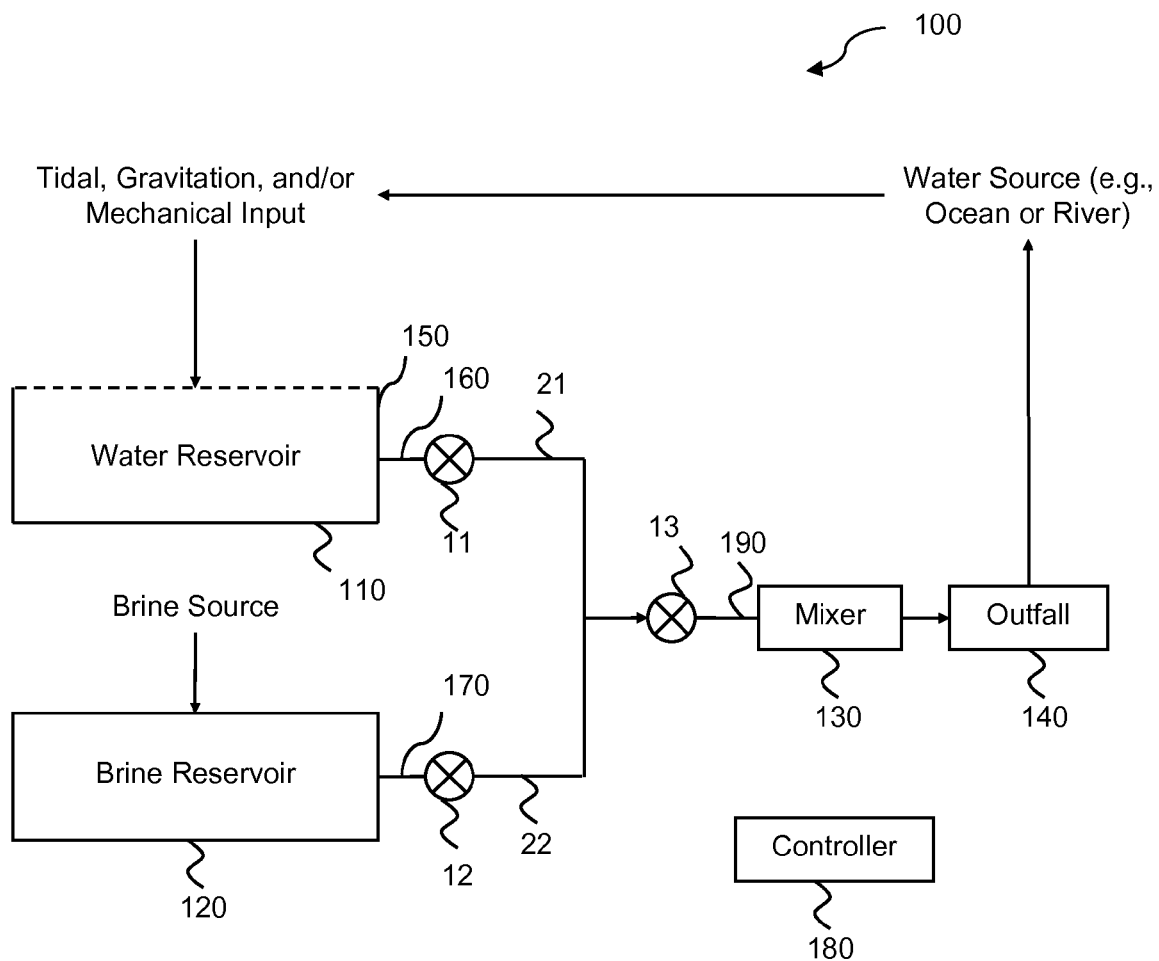
FIGS. 1, 2, 3, and 4 are block diagrams of illustrative embodiments of brine disposal systems.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to brine disposal techniques, systems and methods.

FIG. 1 is an illustrative embodiment of a brine disposal system 100. The brine disposal system 100 includes a water reservoir 110, a brine reservoir 120, an optional mixer 130, an outfall 140, and a controller 180.

The system 100 is located near a water source. In an embodiment, the system 100 is near an ocean and the water reservoir 110 is a seawater reservoir that stores seawater from the ocean. The seawater reservoir 110 can be located in an intertidal zone, which is an area exposed to air during low tide and underwater during high tide. One or more tidal forces, such as those from the moon and the sun, cause seawater to enter the seawater reservoir 110 during high tide and to exit the seawater reservoir 110 during low tide. The seawater reservoir 110 may be partially or entirely man-made. The seawater reservoir 110 has walls and floor to contain the seawater. The seawater reservoir 110 may have an open top and a wall 150 that faces the ocean. The height of the wall 150 may be lower than the high-tide sea level to allow the seawater to crest over the wall 150 and enter the seawater reservoir 110 during high tide. The seawater reservoir 110 may include a bottom outlet 160 that allows the seawater to exit the seawater reservoir 110 during low tide. In the example embodiment described above, the location and the construction configuration of the seawater reservoir 110 allow it to passively collect and discharge the seawater.

In another illustrative embodiment, the seawater reservoir does not collect the seawater on its own. Instead, one or more tidal pools located in the intertidal zone are used to collect the seawater over multiple high tides and the collected seawater is mechanically pumped into the seawater reservoir 110.

The brine reservoir 120 stores brine from a brine source, such as a desalination plant. The brine reservoir 120 may be located in the intertidal zone adjacent to the seawater reservoir 110 or it may be located outside of the intertidal zone elevated or not relative to the seawater reservoir. One or more tidal, gravitational, mechanical, and other forces cause the brine to exit from the brine reservoir 120 during low tide. The brine reservoir 120 may be partially or entirely man-made. The brine reservoir 120 has walls and floor to contain the brine, and an open or a closed top. The brine reservoir 120 may include a bottom outlet 170 that allows the brine to exit the brine reservoir 120 during low tide. In the example embodiment described above, the location and the construction configuration of the brine reservoir 120 allow it to passively discharge the brine.

In an embodiment, the optional mixer 130 is coupled to the seawater reservoir 110 and the brine reservoir 120. The mixer 130 mixes the seawater and the brine that exit from the seawater reservoir 110 and the brine reservoir 120, respectively, during low tide. The mixer 130 provides a mixture of seawater and brine whose salinity is lower than that of the brine received from the brine source. The mixer 130 may be of any type including but not limited to a static mixer or a powered mixer.

When the optional mixer 130 is present, the outfall 140 is coupled to the mixer 130. When the optional mixer 130 is not present, the outfall 140 is coupled to the seawater reservoir 110 and the brine reservoir 120. The outfall 140 discharges the mixture of seawater and brine from the mixer 130 into the ocean. The outfall 140 may be of any type including but not limited to a pipe or a tunnel.

The transfer of the seawater and the brine from the seawater reservoir 110 and the brine reservoir 120, respectively, to the mixer 130 may be implemented using valves and pipes. In an illustrative embodiment, the brine disposal system 100 further includes valves 11 and 12 and pipes 21 and 22. The valve 11 is coupled to the outlet 160 of the seawater reservoir 110, and the valve 12 is coupled to the outlet 170 of the brine reservoir 120. The pipe 21 is coupled between the valve 11 and the mixer 130, and the pipe 22 is coupled between the valve 12 and the mixer 130. A controller 180 is configured to close the valves 11 and 12 for storing the seawater and the brine in the seawater reservoir 110 and the brine reservoir 120, respectively, and to open the valves 11 and 12 during low tide for allowing the seawater and the brine to exit the seawater reservoir 110 and the brine reservoir 120, respectively, by the one or more tidal forces.

Instead of valves 11 and 12, an illustrative embodiment of the brine disposal system 100 may include a valve 13. The valve 13 is coupled to an input 190 of the mixer 130. The pipe 21 is coupled between the outlet 160 of the seawater reservoir 110 and the valve 13, and the pipe 22 is coupled between the outlet 170 of the brine reservoir 120 and the valve 13. Controller 180 is configured to close the valve 13 for storing the seawater and the brine in the seawater reservoir 110 and the brine reservoir 120, respectively, and to open the valve 13 during low tide to allow the seawater and the brine to exit the seawater reservoir 110 and the brine reservoir 120, respectively, by the one or more tidal forces.

In an embodiment, the system 100 is located near a river and the water reservoir 110 is a freshwater reservoir that stores freshwater from the river. One or more gravitational, mechanical, and other forces cause freshwater to enter and exit the freshwater reservoir 110. One or more gravitational, mechanical, and other forces cause the brine to exit from the brine reservoir 120 during low tide. In an embodiment, the optional mixer 130 is coupled to the freshwater reservoir 110 and the brine reservoir 120. The mixer 130 mixes the freshwater and the brine that exit from the freshwater reservoir 110 and the brine reservoir 120, respectively. When the optional mixer 130 is present, the outfall 140 is coupled to the mixer 130. When the optional mixer 130 is not present, the outfall 140 is coupled to the freshwater reservoir 110 and the brine reservoir 120. The outfall 140 discharges the mixture of freshwater and brine from the mixer 130 into the river. The controller 180 is configured to operate the valves 11 and 12 or the valve 13 as described above but without any limitations imposed by the tides.

Figure 2:
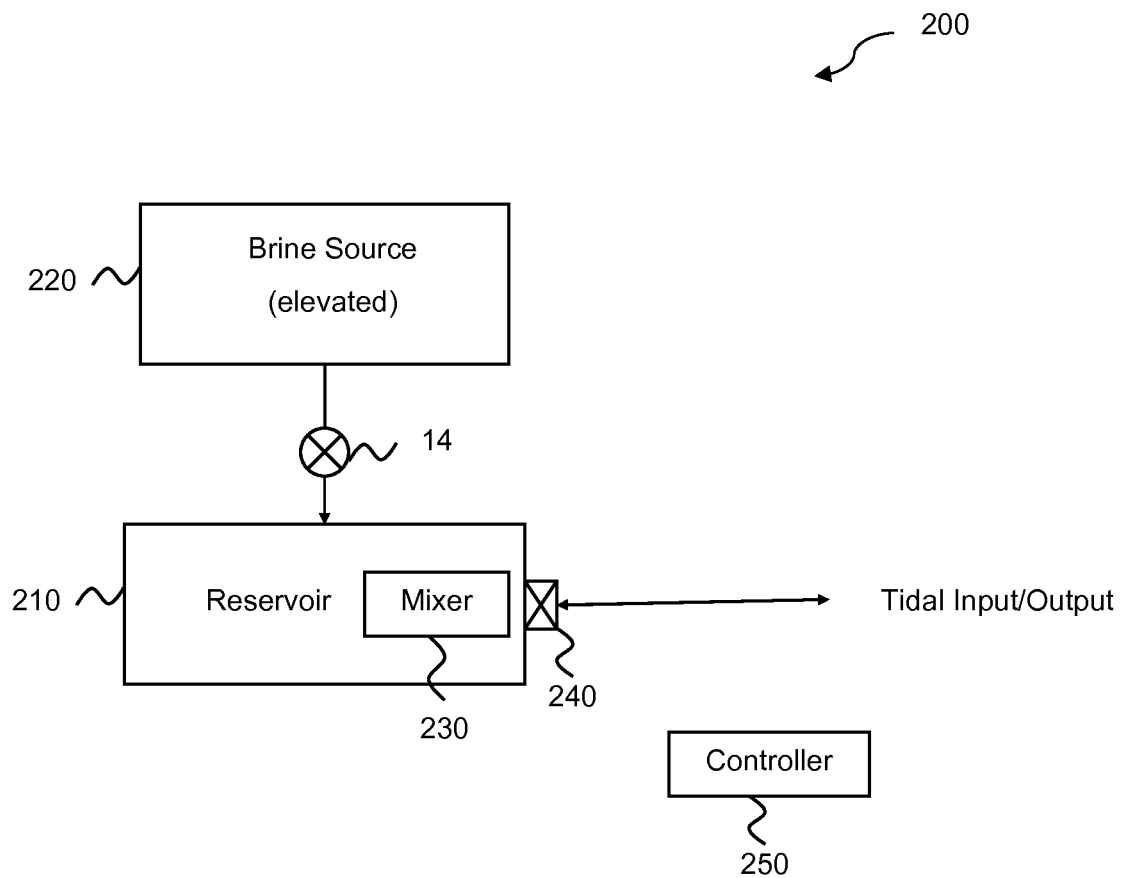

FIG. 2 is a block diagram of an illustrative embodiment of a brine disposal system 200. The brine disposal system 200 includes a reservoir 210, a mixer 230, a tidal port 240, a controller 250, and a valve 14.

The reservoir 210 receives brine from a brine source 220, which can be elevated relative to the reservoir 210. The valve 14 is coupled between the brine source 220 and the reservoir 210 for controlling the release of the brine and its rate. When controller 250 opens the valve 14, the brine source 220 releases the brine into the reservoir 210 by gravity. The brine source 220 may be of any type including but not limited to a brine reservoir coupled to store the brine from another brine source, such as a desalination plant. The brine reservoir 220 may be partially or entirely man-made. The brine reservoir 220 has walls and floor to contain the brine, and an open or a closed top.

In an embodiment, the reservoir 210 is located in an intertidal zone. One or more tidal forces causes seawater to enter the reservoir 210 and mix with the brine released from brine source 220, and the mixture of seawater and brine to exit from the reservoir 210. The reservoir 210 may be partially or entirely man-made. The reservoir 210 has walls and floor to contain the seawater and the brine, and an open or a closed top. Before high tide, the tidal port 240 remains closed so that the brine released from the brine source 220 is stored in the reservoir 210. During high tide, controller 250 opens the tidal port 240 so that the seawater may enter the reservoir 210 by the one or more tidal forces. The tidal movement mixes the seawater with the brine stored in the reservoir 210. After high tide, the tidal port 240 remains open for a period of time so that the mixture of seawater and brine may exit the reservoir 210 during low tide. In the example embodiment described above, the location and the construction configuration of the reservoir 210 allow it to passively collect the seawater and mix it with the brine, and to passively discharge the mixture of seawater and brine.

The mixer 230 is located in the reservoir 210 and further mixes the seawater and the brine. The mixer 230 may be of any type including but not limited to a static mixer or a powered mixer.

Figure 3:
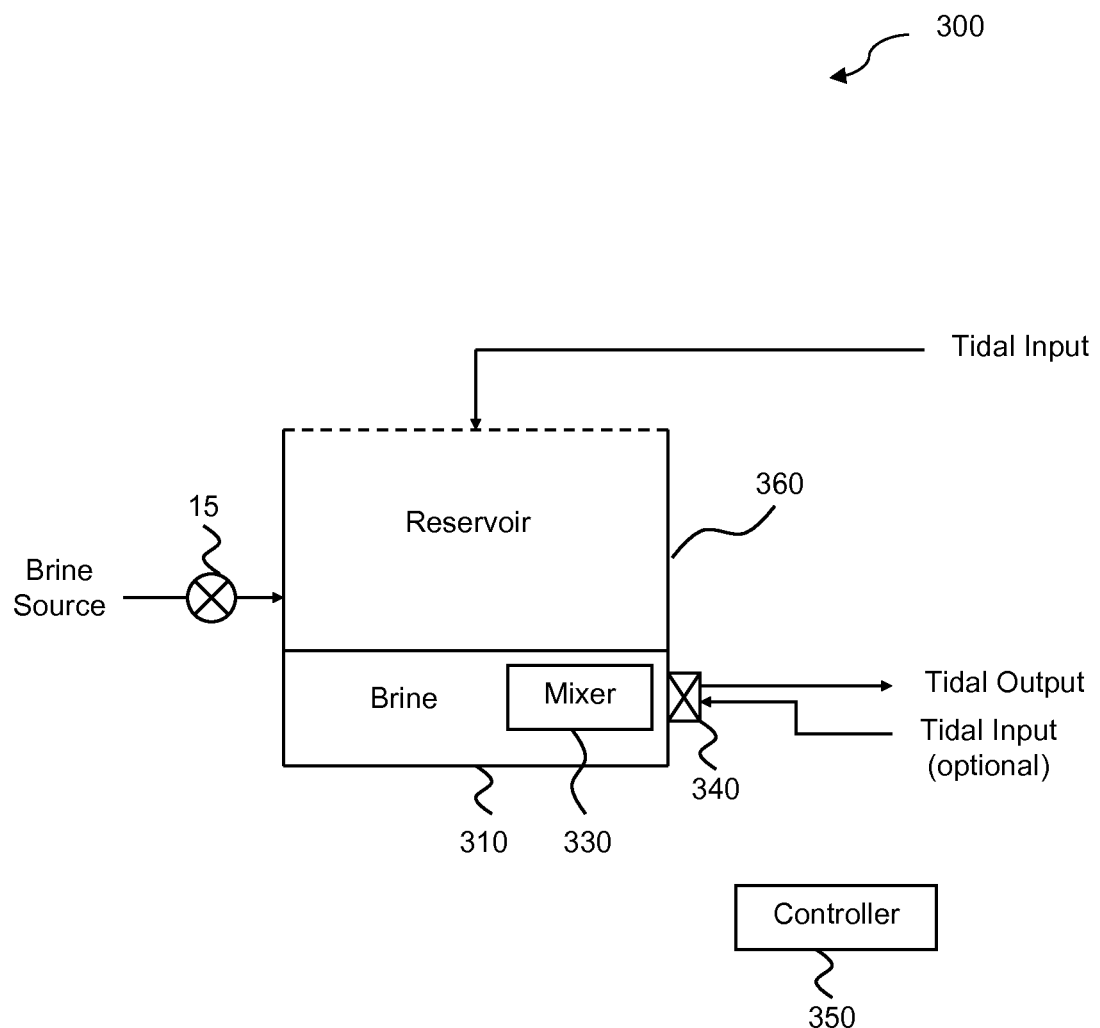

FIG. 3 is a block diagram of an illustrative embodiment of a brine disposal system 300. The brine disposal system 300 includes a reservoir 310, a mixer 330, a tidal port 340, a controller 350, and a valve 15.

The reservoir 310 receives brine from a brine source through the valve 15. When controller 350 opens the valve 15, the brine source releases the brine into the reservoir 310. The brine source may be of any type including but not limited to a desalination plant or a brine reservoir coupled to store the brine from the desalination plant.

The reservoir 310 is located in an intertidal zone. One or more tidal forces causes seawater to enter the reservoir 310 and mix with the brine released from brine source, and the mixture of seawater and brine to exit from the reservoir 310. The reservoir 310 may be partially or entirely man-made. The reservoir 310 has walls and floor to contain the seawater and the brine. The reservoir 310 may have an open top and a wall 360 that faces the ocean. The height of the wall 360 may be lower than the high-tide sea level to allow the seawater to crest over the wall 360 and enter the reservoir 310 during high tide. Before high tide, the tidal port 340 remains closed so that the brine released from the brine source may be stored in the reservoir 310. During high tide, the one or more tidal forces cause the seawater to crest over wall 360 and mix with the brine. After high tide, the controller 350 opens the tidal port 340 for a period of time so that the mixture of seawater and brine may exit the reservoir 310 during low tide. The wall 360 of the reservoir 310 may be a height-adjustable wall for accommodating to variations in the high-tide sea level.

The tidal port 340 may be a sea door at or near the bottom of the reservoir 310. In an illustrated embodiment, the tidal port 340 is only opened for a period of time during low tide for releasing the mixture of seawater and brine. In another illustrated embodiment, the tidal port 340 may also be opened during high tide for gathering more seawater and allowing the tidal movements to further accelerate the mixing process.

The mixer 330 is located in the reservoir 310 and further mixes the seawater and the brine. The mixer 330 may be of any type including but not limited to a static mixer or a powered mixer.

Figure 4:
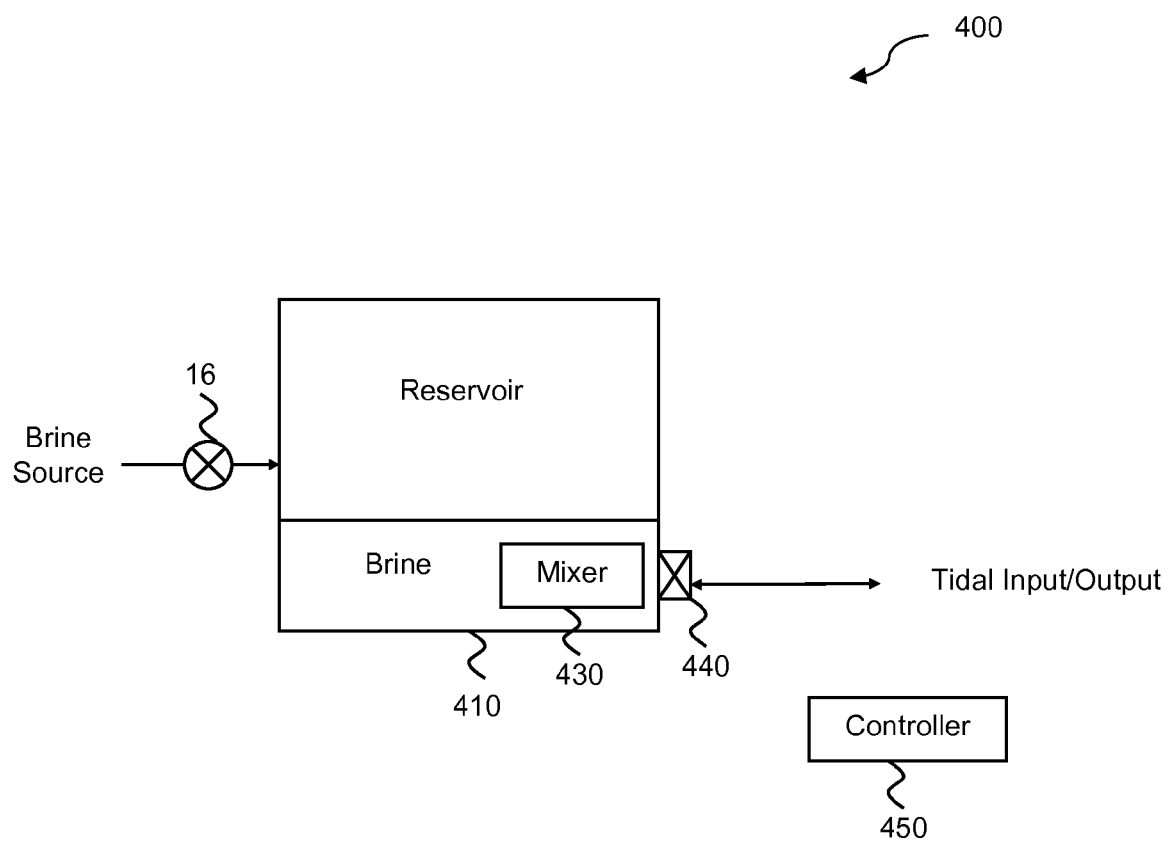

FIG. 4 is a block diagram of an illustrative embodiment of a brine disposal system 400. The brine disposal system 400 includes a reservoir 410, a mixer 430, a tidal port 440, a controller 450, and a valve 16.

The reservoir 410 receives brine from a brine source through the valve 16. When controller 450 opens the valve 16, the brine source releases the brine into the reservoir 410. The brine source may be of any type including but not limited to desalination plant or a brine reservoir coupled to store the brine from the desalination plant.

The reservoir 410 is located in an intertidal zone. One or more tidal forces causes seawater to enter the reservoir 410 and mix with the brine released from brine source, and the mixture of seawater and brine to exit from the reservoir 410. The reservoir 410 may be partially or entirely man-made. The reservoir 410 has walls and floor to contain the seawater and the brine, and an open or a closed top. Before high tide, the tidal port 440 remains closed so that the brine released from the brine source may be stored in the reservoir 410. The tidal port 440 may be a sea door at or near the bottom of the reservoir 410. After the brine is stored in the reservoir 410, the controller opens the tidal port 440 during high tide so that the one or more tidal forces may cause the seawater to enter the reservoir 410 through the tidal port 440 and mix with the brine. After high tide, the tidal port 440 remains open for a period of time so the mixture of seawater and brine may exit the reservoir 410 during low tide.

The mixer 430 is located in the reservoir 410 and further mixes the seawater and the brine. The mixer 430 may be of any type including but not limited to a static mixer or a powered mixer.

In the illustrative embodiments depicted in FIGS. 1 to 4, the capacity of the reservoirs and how the brine from the brine source is released into the reservoir may be determined by the amount of brine to be discharged and the tidal period of the dilution tide. In an example embodiment, assume the tidal period of the dilution tide is about 12.5 hours. In an example embodiment, assume that the amount of brine generated by the brine source, such as by a desalination plant, during the tidal period is equal to "A" tons and has twice the salinity of seawater, a 1:1 dilution factor results in a diluted mixture having 1.5 times the salinity of seawater, and a 1:9 dilution factor results in a diluted mixture having 1.1 times the salinity of seawater.

In one application, the release of high salinity brine into the brine reservoirs 120 and 220 or the reservoirs 310 and 410 is completed before each high tide. Under such circumstance, the brine reservoir 120 and the seawater reservoir 110 in FIG. 1 are each required to contain at least A tons of liquid for 1:1 dilution factor, or are respectively required to contain at least A tons and 9 A tons of liquid for 1:9 dilution factor. The reservoirs 310 and 410 in FIGS. 3 and 4 are each required to contain at least 2 A tons of liquid for 1:1 dilution factor, or at least 10 A tons of liquid for 1:9 dilution factor.

In another application, the release of high salinity brine into the brine reservoirs 120 and 210 or the reservoirs 310 and 320 may also occur during high tide. By periodically opening the valves and modulating the release of the brine during high tide, the size of the reservoirs may be reduced.

Figure 5:
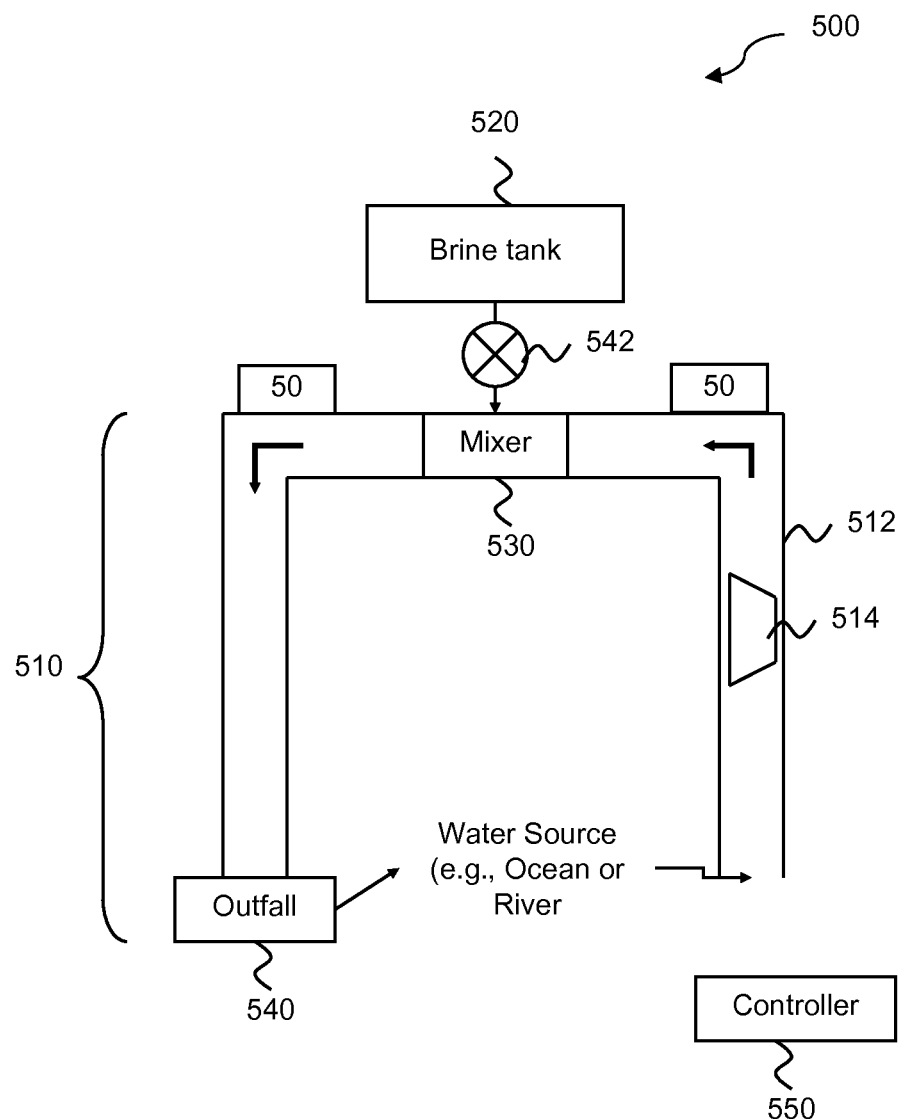
FIG. 5 is a block diagram of illustrative embodiment of a plant.

FIG. 5 is a block diagram of an illustrative embodiment of a plant 500 which uses a once-through cooling system for brine disposal. The plant 500 includes a water cooling system 510, a brine tank 520 and one or more equipment 50. The plant 500 may be of any type including but not limited to a desalination plant, and the equipment 50 may be of any type including but not limited to desalination equipment that generate heat when extracting brine. The brine tank 520 is configured to store the brine generated by the equipment 50.

The water cooling system 510 includes a cooling loop 512, a pump 514, a mixer 530, an outfall 540, a valve 542, and a controller 550. The cooling loop 512 is thermally coupled to the equipment 50 for controlling the operational temperature of the equipment 50. The pump 514 is disposed in the cooling loop 512 for circulating water from a water source (e.g., seawater from an ocean or freshwater from a river) in the cooling loop 512. The brine tank 520 is coupled to valve 542, which is then coupled by the mixer 530 to the cooling loop 512 for mixing the brine and water. The mixing of the brine from the brine tank 520 and the water occurs as the pump 514 circulates the water in the cooling loop 512 and is further aided by the mixer 530. The outfall 540 is coupled to the cooling loop 512 for discharging the mixture of seawater and brine into the water source, thereby minimizing the impacts on the ecosystem. Controller 550 controls valve 542 to control the rate the brine is introduced into cooling loop 512.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A brine disposal system, comprising:
   a water reservoir configured to store water from an ocean water source that experiences high tides and low tides, the water reservoir comprising an outlet and an open portion, the water reservoir located in an intertidal zone of the ocean water source such that the outlet is underwater during high tide, such that water from the ocean water source is allowed to crest over the open portion of the water reservoir to enter the water reservoir during high tide, and such that the outlet is exposed to air to allow water to drain out of the water reservoir during low tide;
   a brine reservoir configured to store brine from a brine source, and configured to allow brine to exit from the brine reservoir in response to one or more of tidal, gravitational, and mechanical forces; and
   an outfall coupled to the water and the brine reservoirs, the outfall configured to discharge a mixture of water and brine into the ocean water source.

2. The brine disposal system of claim 1, wherein the water reservoir is a further configured to store freshwater from a river.

3. The brine disposal system of claim 1, wherein the brine reservoir is located in the intertidal zone and located such that brine is allowed to exit from the brine reservoir during low tide.

4. The brine disposal system of claim 1, further comprising a mixer coupling the water reservoir and the brine reservoir to the outfall, the mixer configured to mix seawater and brine that exit the water reservoir and the brine reservoir during low tide.

5. The brine disposal system of claim 4, further comprising:
   a first valve coupled to the brine reservoir;
   a first pipe coupled between the first valve and the mixer;
   a second valve coupled to the water reservoir;
   a second pipe coupled between the second valve and the mixer; and
   a controller configured to close the first valve to store brine in the brine reservoir, to open the first valve during low tide to allow brine to exit the brine reservoir, to close the second valve to store seawater in the water reservoir, and to open the second valve during low tide to allow seawater to exit the water reservoir.

6. The brine disposal system of claim 5, wherein the water reservoir comprises a wall facing the ocean, the wall configured to allow seawater to crest over the wall during high tide.

7. The brine disposal system of claim 4, further comprising:
   a valve coupled to the mixer;
   a first pipe coupling the water reservoir to the valve;
   a second pipe coupling the brine reservoir to the valve; and
   a controller configured to close the valve to store seawater in the water reservoir and brine in the brine reservoir, and to open the valve during low tide to allow seawater to exit the water reservoir and brine to exit the brine reservoir.

8. The brine disposal system of claim 1, wherein the brine source comprises:
   equipment configured to generate freshwater and brine from saltwater taken from the ocean water source; and
   a water cooling system, comprising:
      a cooling loop thermally coupled to the equipment;
      a pump configured to circulate saltwater from the ocean water source in the cooling loop; and
      a mixer coupled to the brine reservoir and to the cooling loop, the mixer configured to mix brine from the brine reservoir with saltwater flowing in the cooling loop;
   wherein the outfall is coupled to the cooling loop and the outfall is configured to discharge a mixture of saltwater and brine into the water source.

9. The brine disposal system of claim 8, wherein the water cooling system is a once-through cooling system.

10. The brine disposal system of claim 8, wherein the cooling loop is thermally coupled to at least one portion of the equipment on one side of the mixer and wherein the cooling loop is thermally coupled to at least another portion of the equipment on another side of the mixer.

11. A brine disposal system, comprising:
    a reservoir configured to receive seawater and brine, the reservoir located in an intertidal zone;
    a tidal port coupled to the reservoir in the intertidal zone, wherein the tidal port is located such that the tidal port is submerged during high tide and seawater is allowed to pass into the reservoir through the tidal port during high tide, and wherein the tidal port is located such that the tidal port is not submerged during low tide and a mixture of seawater and brine is allowed to exit from the reservoir through the tidal port during low tide; and
    a valve coupled between a brine source and the reservoir.

12. The brine disposal system of claim 11, wherein the brine source comprises a brine reservoir configured to store brine from another brine source.

13. The brine disposal system of claim 12, wherein the brine reservoir is elevated relative to the reservoir.

14. The brine disposal system of claim 11, further comprising a mixer in the reservoir, the mixer configured to mix seawater and brine.

15. The brine disposal system of claim 11, further comprising a controller coupled to the valve, the controller configured to control release of brine into the reservoir.

16. The brine disposal system of claim 11, wherein the tidal port comprises a sea door at or near a bottom of the reservoir.

17. A brine disposal system, comprising:
    a reservoir configured to receive seawater and brine, the reservoir located in an intertidal zone;
    a tidal port coupled to the reservoir, wherein the tidal port is located such that seawater is allowed to pass into the reservoir through the tidal port during high tide, and wherein the tidal port is located such that a mixture of seawater and brine is allowed to exit from the reservoir through the tidal port during low tide; and a valve coupled between a brine source and the reservoir; wherein the reservoir comprises a wall facing an ocean, wherein the wall is configured to allow seawater to crest over the wall and to mix with brine in the reservoir during high tide.

18. The brine disposal system of claim 17, wherein the wall comprises a height-adjustable wall.

* * * * *

UNITED STATES PATENT AND TRADEMARK OFFICE
CERTIFICATE OF CORRECTION

PATENT NO. : 8,657,528 B2  
APPLICATION NO. : 13/062936  
DATED : February 25, 2014  
INVENTOR(S) : Chen et al.

Page 1 of 1

It is certified that error appears in the above-identified patent and that said Letters Patent is hereby corrected as shown below:

On Title Page 2, in item (56), under "OTHER PUBLICATIONS", in Column 2, Line 21, delete "Moneterey Peninsula,"" and insert -- Monterey Peninsula," --, therefor.

In the Specification

In Column 4, Line 9, delete "reservoir 220" and insert -- reservoir 210 --, therefor.

In Column 4, Line 11, delete "220 has" and insert -- 210 has --, therefor.

In the Claims

In Column 7, Line 46, in Claim 2, delete "is a further" and insert -- is further --, therefor.

Signed and Sealed this
Twenty-sixth Day of August, 2014

Michelle K. Lee
*Deputy Director of the United States Patent and Trademark Office*